US 009898327 B2

(12) United States Patent
Paolino et al.

(10) Patent No.: US 9,898,327 B2
(45) Date of Patent: Feb. 20, 2018

(54) COMPUTE NODE SUPPORTING VIRTUAL MACHINES AND SERVICES

(71) Applicant: Virtual Open Systems, Grenoble (FR)

(72) Inventors: Michele Paolino, Grenoble (FR); Salvatore Daniele Raho, Grenoble (FR)

(73) Assignee: Virtual Open Systems, Grenoble (FR)

( * ) Notice: Subject to any disclaimer, the term of this patent is extended or adjusted under 35 U.S.C. 154(b) by 44 days.

(21) Appl. No.: 15/073,874

(22) Filed: Mar. 18, 2016

(65) Prior Publication Data
US 2016/0274933 A1    Sep. 22, 2016

(30) Foreign Application Priority Data
Mar. 20, 2015    (EP) .................................... 15305411

(51) Int. Cl.
*G06F 9/455*    (2006.01)
*G06F 9/50*    (2006.01)

(52) U.S. Cl.
CPC ........ *G06F 9/45558* (2013.01); *G06F 9/5077* (2013.01); *G06F 2009/45562* (2013.01)

(58) Field of Classification Search
None
See application file for complete search history.

(56) References Cited

U.S. PATENT DOCUMENTS

| 5,491,827 A * | 2/1996 | Holtey ................. G06Q 20/341 |
| | | 711/163 |
| 2012/0030676 A1 | 2/2012 | Smith et al. |
| 2013/0031374 A1 | 1/2013 | Thom et al. |
| 2014/0208123 A1 | 7/2014 | Roth et al. |

OTHER PUBLICATIONS

Mikael Asberg et al. "Towards Real-Time Scheduling of Virtual Machines Without Kernel Modifications," Emerging Technologies & Facory Automation, 2011 IEEE 16th Conference, Sep. 5, 2011, pp. 1-4.
Stefan Berger et al., "vTPM: Virtualizing the Trusted Platform Module," IBM Research Report, Feb. 14, 2006.

* cited by examiner

*Primary Examiner* — Gregory A Kessler
(74) *Attorney, Agent, or Firm* — The Noblitt Group, PLLC

(57) ABSTRACT

The invention concerns a compute node comprising: one or more processors; one or more memory devices storing software enabling virtual computing resources and virtual memory to be assigned to support:—a virtual machines compartment (402) in which a plurality of virtual machines (VM) is enabled by a hypervisor; and—a services compartment (404) comprising an operating system (OS) enabling one or more of real time capabilities, security functionality, and hardware accelerators, wherein the services compartment further comprises a virtual machines service manager (412) adapted to manage service requests received from the virtual machines; and a hardware partition (418) providing access control between the virtual machines (408) and the virtual machines services compartment (404).

14 Claims, 4 Drawing Sheets

COMPUTE NODE SUPPORTING VIRTUAL MACHINES AND SERVICES

CROSS-REFERENCES TO RELATED APPLICATIONS

This application claims the benefit of European Patent Application No. 15305411.9, filed Mar. 20, 2015, and incorporates the disclosure of the application by reference.

The work leading to this invention has received funding from the European Union Seventh Framework Programme FP7/2007-2013 and Horizon 2020 Programme H2020/2014-2020 under grant agreements no 318036 and no 645119.

FIELD

The present disclosure relates to the field of compute nodes providing an execution environment for virtual machines, and to methods and systems for implementing compute nodes.

BACKGROUND

A compute node is a combination of hardware resources, including one or more processing devices, memory and networking circuits, as well as a software module known as a hypervisor. The hypervisor is used to support a plurality of virtual machines, each for example being associated with a different operating system. A compute node provides a single execution environment in which more than one virtual machine may be executed.

In certain applications, it may be desired to provide a protected execution environment, for example for security applications, such as encryption or decryption, for real time services, and/or for other services.

However, while it would be beneficial to be able to allow virtual machines to make use of such services, there is currently no mechanism permitting this to be achieved without a complex and costly implementation involving several integrated circuits.

SUMMARY

It is an aim of embodiments of the present disclosure to at least partially address one or more problems in the prior art.

According to one aspect, there is provided a compute node comprising: one or more processors; one or more memory devices storing software enabling virtual computing resources and virtual memory to be assigned to support: a virtual machines compartment in which a plurality of virtual machines is enabled by a hypervisor; and a services compartment comprising an operating system enabling one or more of: real time capabilities, security functionality, and hardware accelerators, wherein the services compartment further comprises a virtual machines service manager adapted to manage service requests received from the virtual machines; and a circuit, for example in the form of a hardware partition, providing access control between the virtual machines and the virtual machines services compartment.

According to one embodiment, the circuit providing said access control comprises: a first memory zone within the one or more memory devices accessible from only the services compartment; and a second memory zone within the one or more memory devices accessible from both the services compartment and the virtual machines compartment.

According to one embodiment, the circuit providing said access control further comprises a bus accessible by the one or more processors and coupled to the one or more memory devices, the bus having one or more bus lanes providing one or more access control bits wherein: the first memory zone is associated with a first identifier comprising the access control bits and is adapted to be accessible by the bus only when the one or more access control bits define a first state; and the second memory zone is a shared memory associated with a second identifier comprising the access control bits and is adapted to be accessible by the bus only when the one or more access control bits define a second state different to the first state, wherein the second identifier of the shared memory is allocated by the virtual machine service manager.

According to one embodiment, the one or more processors are adapted to apply an identifier having the first state of the access control bits on the one or more bus lanes when accessing the first memory zone during execution of a service operation associated with the services compartment; and to assert an identifier having the second state of the access control bits on the one or more bus lanes when accessing the second memory zone in order to share data between the virtual machines compartment and the services compartment.

According to one embodiment, a first of the virtual machines is adapted to access the services compartment by executing a service request instruction configured to be trapped by the hypervisor of the virtual machines compartment and communicated to the virtual machines service manager.

According to one embodiment, the services compartment comprises a hardware accelerator, the hardware accelerator comprising one or more of: an FPGA (field programmable gate array); a GPU; a DSP; and an ASIC (application specific integrated circuit).

According to one embodiment, the services compartment comprises a virtual trusted platform module.

According to a further aspect, there is provided a telecommunications system comprising the above compute node, wherein the services compartment is adapted to execute first and second communications applications, the circuit providing said access control being adapted to permit a first virtual machine of the virtual machine compartment to access the first communications application and not the second communications application.

According to a further aspect, there is provided an automotive computing system comprising the above compute node, wherein the services compartment is adapted to execute at least one real time function for controlling one or more of: a braking system; a video assistance system; an anti-theft security system; and a speed regulation system.

According to a further aspect, there is provided a method of accessing, by a first virtual machine of a plurality of virtual machines, services comprising one or more of real time capabilities, security functionality and hardware acceleration; the method comprising: providing a compute node comprising: one or more processors; and one or more memory devices storing software enabling virtual computing resources and virtual memory to be assigned to support a virtual machines compartment in which the plurality of the virtual machines is enabled by a hypervisor; and a services compartment comprising an operating system enabling the services, wherein the services compartment further comprises a virtual machines service manager for managing service requests received from the virtual machines; and providing access control between the virtual machines and the virtual machines services compartment, for example using a hardware partition.

According to one embodiment, the method further comprises: executing, by the first virtual machine, a service request instruction; trapping the service request instruction by the hypervisor of the virtual machines compartment; and communicating the service request instruction to the virtual machines service manager.

According to one embodiment, the method further comprises executing the service request instruction by the virtual machines services compartment and providing a result to the first virtual machine via a memory zone shared by the first virtual machine and the virtual machine services compartment.

According to one embodiment, the service request instruction is a secure monitor call instruction.

According to a further aspect, there is provided method comprising: instantiating a new service by a first virtual machine; and accessing the new service by the first virtual machine according to the above method.

According to a further aspect, there is provided a computer-readable storage medium storing software instructions executable by one or more processors to cause the implementation of the above method.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Figure 1:
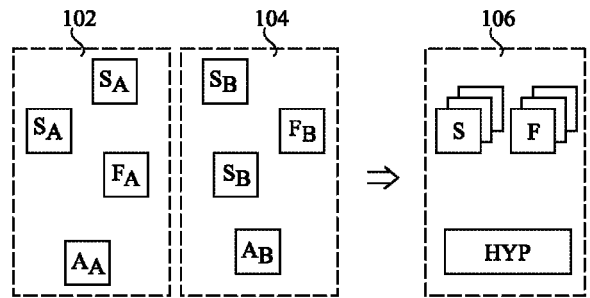
FIG. 1 schematically illustrates a partial implementation of functions of two mobile telecommunications systems by a compute node according to an example embodiment.

FIG. 1 schematically illustrates functional components of a mobile telecommunications network 102 and of a further mobile telecommunications network 104.

The network 102 for example comprises switching, firewall and antenna communications functions represented by switches $S_A$, a firewall $F_A$ and an antenna $A_A$. Similarly, the network 104 for example comprises switching, firewall and antenna communications functions represented by switches $S_B$, a firewall $F_B$ and an antenna $A_B$. Of course, the networks 102 and 104 may comprise many more components.

Rather than providing separate hardware for implementing each of the functions of the components in each network, it may be desirable to provide a single compute node 106 using a hypervisor (HYP) to support virtual machines implementing these functions. Such an approach is known in the art as NFV (network function virtualisation).

However, while such a compute node may well be capable of implementing switches and firewalls, certain features cannot be supported. In particular, the antenna for example has strict real time requirements which do not permit it to be operated by a standard compute node.

Furthermore, there are multitenancy issues in implementing telecommunications function using a compute node. In particular, in a large, cloud-based NFV datacentre, the virtual machines are likely to belong to different entities. For example, the two networks 102 and 104 of FIG. 1 may belong to different entities. There is thus a need to guarantee strong isolation between the applications associated with each entity, for example between applications implementing the functions of the communication antennas $A_A$ and $A_B$.

This leads to a technical problem in implementing the functional components of the networks 102, 104 using a standard compute node. An alternative would be to provide a separate hardware device for implementing the secure features, by this would add cost and complexity to the computing system.

Figure 2:
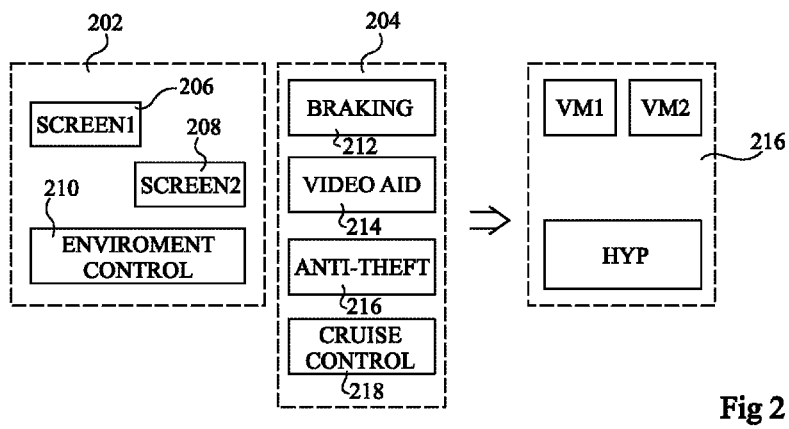
FIG. 2 schematically illustrates a partial implementation of automotive computing systems using a compute node according to an example embodiment.

FIG. 2 illustrates separate computer systems 202 and 204 in an automotive system. The computer system 202 for example comprises one or mode display screens 206, 208, and an environment control unit 210 for controlling functions such as air conditioning and heating in the vehicle. The computer system 204 for example comprises a computer 212 implementing braking functions of the vehicle. A further computer 214 for example supports video aids in the vehicle, for example for use in reversing or providing automatic detection of potential hazards in a road ahead. A further computer 216 for example implements anti-theft functions such as the activation and deactivation of an alarm system and/or or vehicle tracking functionality. Yet a further computer 218 for example implements speed regulation functions, in other words cruise control.

Again, it would be desirable to apply an NFV approach to the implementation of the computing systems of FIG. 1. However, while the functions of the computer system 202 can be implemented by a compute node 216 comprising a hypervisor (HYP) supporting two or more virtual machines VM1 and VM2, the braking and video aid functions of the computing system 204 for example require a secure environment that provides real time services such that the braking, cruise control and video control functions are provided without delay. Furthermore, for security reasons, the anti-theft functions for example require certain security functions to be implemented, such as cryptographic functions.

As with the example of FIG. 1, this leads to the situation in which it would be necessary to provide a separate hardware device for implementing the secure features of the computing system of FIG. 2, but this would add cost and complexity to the computing system.

Figure 3:
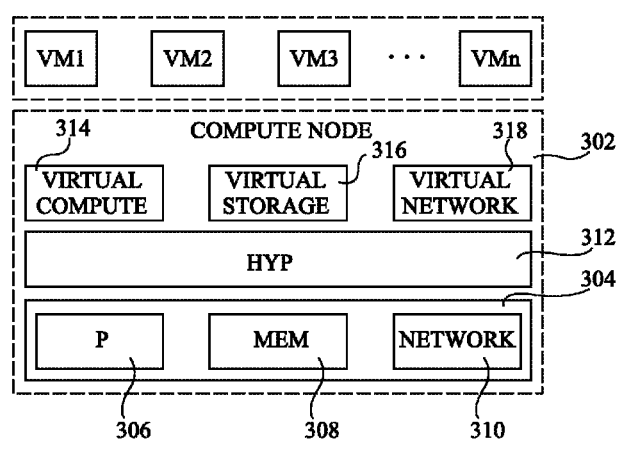
FIG. 3 schematically illustrates a compute node supporting a plurality of virtual machines according to an example embodiment.

FIG. 3 illustrates a compute node 302 supporting a plurality of virtual machines VM1 to VMn according to an example embodiment. As illustrated, the compute node 302 for example comprises hardware components 304, including one or more processors 306, memory devices 308, and networking circuits 310. Furthermore, the memory devices 308 for example store software including an operating system providing the hypervisor 312, which supports and enables the virtual machines to execute. Indeed, the hypervisor for example supports a virtual compute module 314, which assigns processing functions to the virtual machines, a virtual storage module 316, which assigns memory space to the virtual machines, and a virtual network module 318, which enables the virtual machines to access the network hardware 310.

Figure 4A:
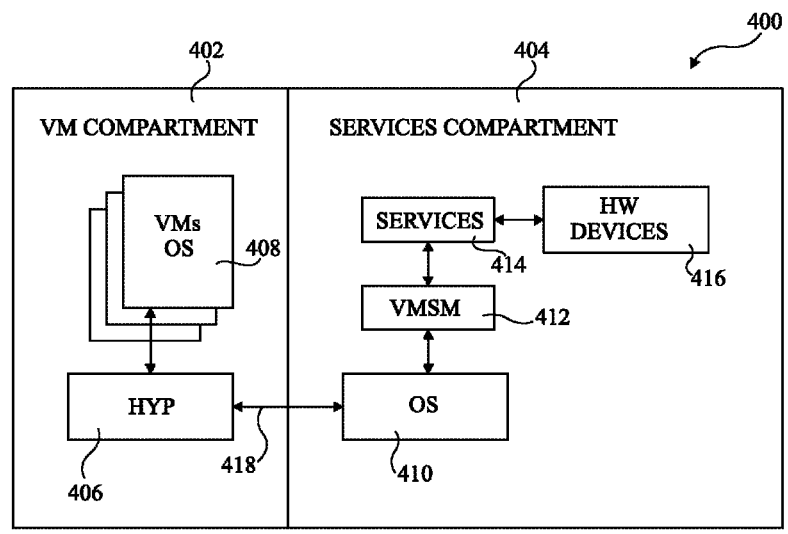
FIG. 4A schematically illustrates a dual-compartment compute node according to an example embodiment of the present disclosure.

FIG. 4A schematically illustrates a dual-compartment compute node 400 according to an example embodiment of the present disclosure. The dual-compartment compute node 400 is for example implemented based on the hardware of FIG. 3, with some further hardware devices and a hardware partition as will be described in more detail below.

The dual-compartment compute node 400 comprises a compartment 402, which will be referred to herein as a virtual machine compartment, and which supports a plurality of virtual machines. The dual-compartment compute node 400 also comprises a services compartment 404, which for example provides a protected execution environment for certain services such as real time capabilities, security applications, hardware acceleration devices, or the like.

In particular, the virtual machine compartment 402 for example comprises software implementing the hypervisor 406, and the plurality of virtual machines 408, each for example being associated with a different operating system.

The service compartment 404 for example comprises an operating system 410, which will be referred to herein as a "full-fledged" operating system, implying that it for example permits a standard instruction set, providing a broad range of capabilities. The operating system 410 for example communicates with a virtual machine services manager 412, which is a software module that controls an interface between the services provided by the service compartment and the virtual machines 408 of the VM compartment. For example, the virtual machine services manager 412 stores data related to the services, the virtual machines, and the hypervisor, and permits interaction between these elements.

The services are for example represented by a block 414, which comprises software executing the real time functionality. This may also be coupled to one or more hardware devices 416 including one or more hardware accelerators, one or more FPGAs (field programmable gate arrays) and/or one or more ASICs (application specific integrated circuits), such as DSPs (digital signal processors), GPUs (graphics processing units), etc. In some embodiments, the services may further comprise a virtual trusted platform module (vTPM), as described in more detail in US patent application published as US2012/0030676, the contents of which is hereby incorporated by reference to the extent permitted by the law, and as described in the publication entitled "vTPM: Virtualizing the Trusted Platform Module", S. Berger et al., IBM research division, RC23879 (W0602-126) Feb. 14, 2006, the contents of which is hereby incorporated by reference to the extent permitted by the law.

A communication link 418 between the compartments 402, 404, for example between the hypervisor 406 and the operating system 410, is for example protected by a hardware partition, which provides access control between the compartments. For example, the hardware partition is implemented using a solution known in the art as the "ARM TrustZone" (the name ARM TrustZone may correspond to one or more registered trademarks). Such a solution is for example described in more detail in US patent application published as US20130031374, the contents of which is hereby incorporated by reference to the extent pemitted by the law.

The hardware partition present between the two worlds provided by the compartments 402, 404 is for example implemented by using a set of system signals over a system bus to specify, for each transaction, the intended compartment. These signals are also for example used to specify the peripheral address space, such that the use of devices can be restricted to one of the components 402, 404. Additionally, each cache line could be tagged with an identifier associated with the compartment to be used.

Furthermore, communications between the compartments 402, 404 is for example made using a specific instruction set extension, which could be a single instruction or a set of instructions executed by a VM, causing a jump to be performed. Furthermore, data may be transferred between the two worlds 402, 404 using a shared memory.

In some embodiments, shared memory accesses are rendered secure using a mandatory access control (MAC) technology such as SELinux, AppAmor, SMACK, etc.

In alternative embodiments, access control tags are used for the various hardware resources for implementing access control. For example, memory, memory mapped devices, and system bus messages of the compute node 302 include tags restricting access to these components. An example of such a solution will now be described in more detail with reference to FIG. 4B.

Figure 4B:
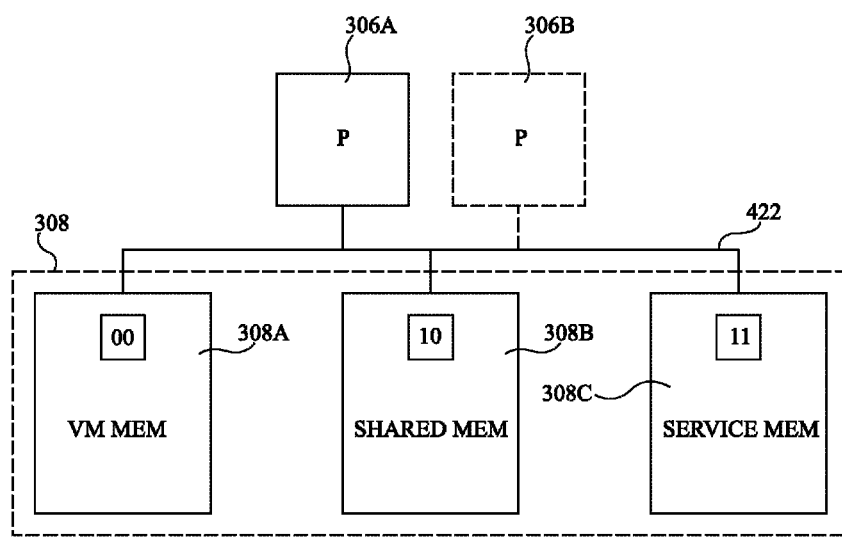
FIG. 4B schematically illustrates a hardware partition of the dual-compartment compute node of FIG. 4A according to an example embodiment.

FIG. 4B schematically illustrates an implementation of the hardware partition of the dual-compartment compute node 400 of FIG. 4A according to an example embodiment.

The one or more processors 306 of the compute node for example comprise a processor 306A, and optionally a further processor 306B, which may access a system bus 422. In some examples, the processor 306A may be dedicated to hosting the one or more operating systems of the virtual machines 408 and/or of the hypervisor 406, and the further processor 308B is dedicated to hosting the operating system 410 of the services compartment 404. Alternatively, the processors 306A and 306B may provide processing resources shared by the virtual machine compartment 402 and by the services compartment 404.

The system bus 422 provides access to the one or more memory devices 308 of the compute node 302, which for example comprises three distinct memory zones 308A, 308B and 308C. In some examples, each of these memory zones is implemented by a distinct memory device, whereas in alternatively embodiments they could be zones of memory addresses within one or more memory devices.

The memory zone 308A is for example a zone dedicated for exclusive use by the VM compartment 402, for example by one or more of the virtual machines of the VM compartment 402.

The memory zone 308C is for example a zone dedicated for exclusive use by the services compartment 404, for example by the operating system 410, the VM services manager 412 and/or services 414 of the services compartment 404.

The memory zone 308B is for example a shared memory zone accessible by both compartments 402, 404, for example by one or more of the virtual machines 408 of the VM compartment and by the operating system 410, the VM services manager 412 and/or one or more services of the services compartment 404.

The access control among the memory zones is for example achieved by access control bits forming part of a unique identifier of each memory zone 308A, 308B, 308C.

For example, the zone 308A has an identifier "00", where "00" are the access control bits, the zone 308C has an identifier "11", wherein "11" are the access control bits, and the zone 308B has an identifier "10SHMEMID", wherein "10" are the access control bits. Furthermore, bus lanes of the system bus 422 are for example used to transmit the access control bits such that messages cannot be accessed by unauthorized elements.

The identifier SHMEMID is a series of bits which identifies a specific shared memory. For example, a single virtual machine can have more than one shared memory for one or more secure services.

The identifier SHMEMID is for example defined, controlled and managed by the VM Services Manager 412 in the service compartment, which allocates, creates and deletes shared memory zones for the virtual machines.

For example, when the processor 306A is executing an application of a virtual machine of the VM compartment 402, and is to access the memory zone 308A, it asserts the access control bits "00" over the system bus 422 with the memory access instruction such that only the memory zone 308A is addressed.

If the processor 306B is executing an application within the OS 410 associated with one of the services 414 of the services compartment 404, and is to access the memory zone 308C, it asserts the access control bits "11" over the system bus 422 with the memory access instruction such that only the memory zone 308C is addressed.

If however the processor 306A or 306B is executing an application that is to share data between the compartments 402 and 404, for example if an application running in the operating system 410 needs to provide the result of a service operation to the VM that requested the service, the memory zone 308B is accessed by asserting the access control bits "10" over the system bus 422 with the memory access instruction such that only the memory zone 308B is addressed.

It will be apparent to those skilled in the art that the above description of the identifier is merely one example, and that it would be possible to use a different number of access control bits, and to assign different values of the bits to the memory zones.

Figure 5:
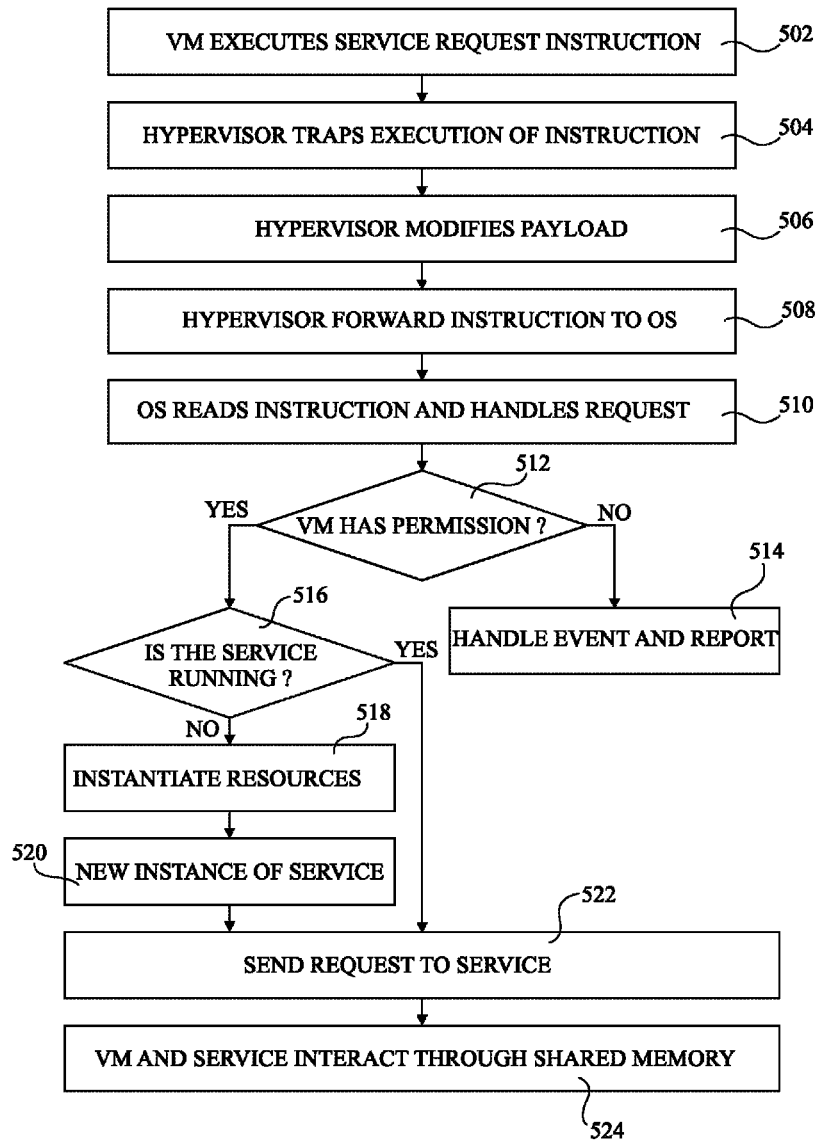
FIG. 5 is a flow diagram illustrating steps in a method of permitting communication between a plurality of virtual machines and a services compartment of the circuit of FIG. 4.

FIG. 5 is a flow diagram illustrating operations in a method of interacting between virtual machines of the VM compartment 402, and the services compartment 404.

In a first operation 502, one of the virtual machines for example executes a service request instruction INSTR for requesting a service from the services compartment. This instruction is for example an instruction set extension, and for example triggers a jump condition. In some embodiments, the instruction may correspond to a secure monitor call (SMC), which is a type of instruction known to those skilled in the art. The instruction for example includes a virtual machine payload, which is for example of 16 bits.

In a subsequent operation 504, the hypervisor for example traps the execution of the virtual machine at the INSTR instruction. In particular, the jump instruction for example causes an exception during the execution flow of the virtual machine, which causes the hypervisor to take control.

In a subsequent operation 506, the hypervisor for example modifies the payload of the instruction. For example, this enables concurrency and the execution of unmodified applications in the guest application. In particular, the service request instruction is for example used for jumps coming from both host and guest applications, in other words applications run by the virtual machine and the hypervisor. In some embodiments, both the host and guest applications in the VM compartment are to identify themselves when requesting the service, for example if there are statefull services in the services compartment 404. Thus assuming that the jump instruction has a syntax along the lines of INSTR<JUMP CONDITION><APP_ID><SERVICE_ID>, the VM payload is for example modified to be along the lines of <VM_ID><REDUCED_APP_ID><SERVICE_ID>. For stateless services, the field <APP_ID> is for example omitted.

In a subsequent operation 508, the hypervisor forwards the modified request to the full-fledged operating system 410 of the services compartment.

In a subsequent operation 510, the operating system 410 for example reads the payload, and handles a request through the virtual machine service manager 412.

In a subsequent operation 512, it is for example determined whether the virtual machine has permission for the requested service. Indeed, part of the protection mechanism in place may prevent unauthorized virtual machines from accessing services that they are not authorized to access. For example, only some of the virtual machines may be authorized to access security functions, while other virtual machines may be permitted to use real time capabilities. If the virtual machine does not have permission for the given service, in a subsequent operation 514, the operating system for example handles the event and reports the issue. In particular, if the virtual machine or hypervisor requests a service without having the necessary rights, the VM service manager for example notifies the hypervisor via the OS 410. At this point, the hypervisor, or a VM management program/library on its behalf, e.g. libvirt, may decide to perform operations such as reporting the issue to the user/owner of the VM, destroying the VM, freezing the VM until maintenance or a debug, migrate the VM, forwarding the error inside the VM, etc. The hypervisor, or a VM management program/library on its behalf, e.g. libvirt, is for example aware of the request history of a specific VM, and can thus exploit this knowledge to make an appropriate decision and take appropriate action. For example, the VM may be destroyed following a certain number of critical security failures.

If however in operation 512 the virtual machine does have permission for the service, in a subsequent operation 516, it is determined whether or not the service is currently running. If not, in an operation 518, the resources are instantiated, which for example involves assigning shared memory, hardware devices, accelerators, etc., to this operation. Then, in a subsequent operation 520, a new instance of the service is spawned. In particular, after the resources have been instantiated, the service is run. At the same time, a message from the VM services manager is for example sent to the VM which requested the service, such that the VM knows that it can start to use the service.

In a subsequent operation 522, which is for example performed after operation 516 in the case that service is already running, the request is sent to the service, and then in final operation 524, the VM and the service for example interact via a shared memory as described above.

Figure 6:
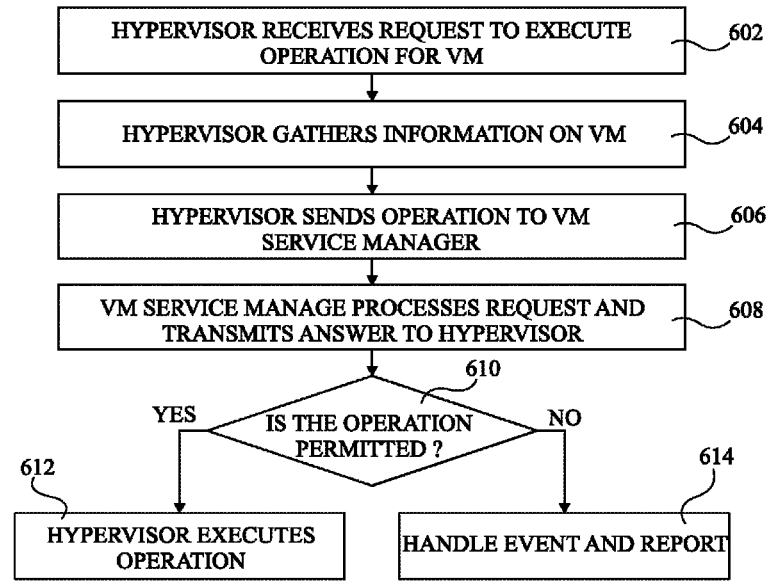
FIG. 6 is a flow diagram representing operations in a method of permitting communication between a hypervisor of the compute node and the services compartment of the circuit of FIG. 4.

FIG. 6 is a flow diagram illustrating an example of operations between the hypervisor 406 of the VM compartment 402 and the services compartment 404.

In a first operation 602, the hypervisor for example receives a request to execute a certain operation for a virtual machine. Such operations for example may include a boot operation of a given virtual machine, a destroy operation indicating that the virtual machine is to be disabled, a shutdown operation for a virtual machine according to which the operating system is turned off but all of the resources and data structures are conserved, a verification of the virtual machine resources, or automatic injection of software inside the VM using APIs (application program interfaces), scripts etc.

In a subsequent operation 604, depending on the operation, the hypervisor gathers information on a specific virtual machine, such as for example, the request history, its owner, its resources, etc.

In a subsequent operation 606, the hypervisor sends the information, along with the operation, to the virtual machine service manager 412 of the service compartment.

In a subsequent operation 608, the virtual machine service manager 412 for example elaborates a request and sends an answer back to the hypervisor.

In a subsequent operation 610, it is determined whether or not the operation is permitted. If so, the hypervisor executes the operation in a subsequent operation 612. Alternatively, in an operation 614, the event is handled and reported.

Figure 7:
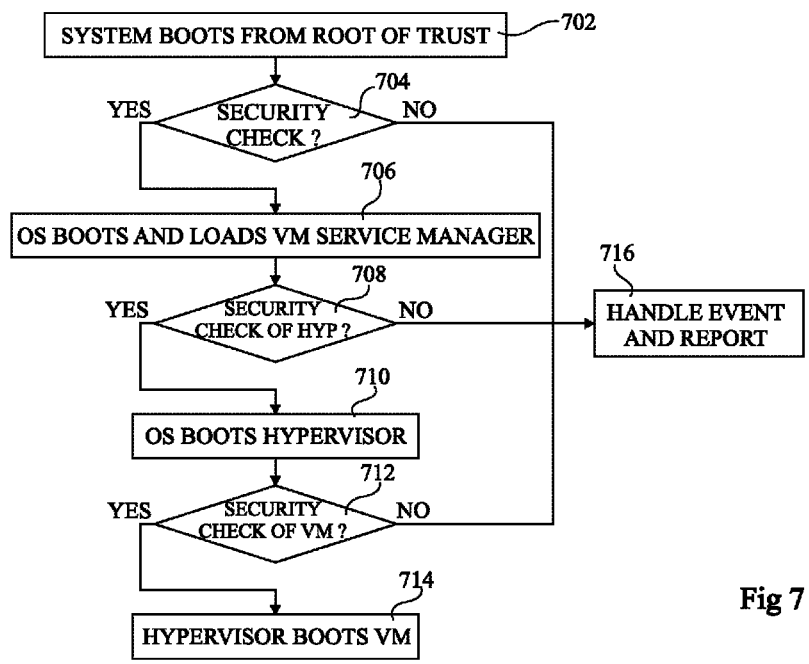
FIG. 7 is a flow diagram illustrating operations in a boot process according to an example embodiment.

FIG. 7 is a flow diagram illustrating operations in a boot sequence according to an example embodiment.

In a first operation 702, the system for example boots from the program stored in an on-chip ROM, from where the root of trust resides.

In a subsequent operation 704, it is determined whether or not the security check of the full-fledged operating system 410 has been successfully performed.

If so, the next operation is 706, in which the operating system 410 boots and loads of the applications that are safety critical for the system, including the virtual machine services manager 412.

Then, in a subsequent operation 708, it is determined whether the security check of the hypervisor was successful. If so, in a next operation 710, the operating system 410 boots the hypervisor in the compartment 402.

In a subsequent operation 712, it is for example determined whether a security check of the virtual machine is successful. If so, in a subsequent operation 714, the hypervisor boots the virtual machine.

If however in any of the operations 704, 708 and 712 it is determined that the corresponding security check was not performed successfully, the event is for example handled, and reported in an operation 716.

An advantage of the embodiments described herein is that, by providing a compute node having a virtual machines compartment and a services compartment, with access control between the compartments being controlled by a hardware partition, services such as real time capabilities, security functionality, and hardware accelerators, can be provided to the virtual machines in a secure fashion.

For example, in the case of the telecommunications networks represented in FIG. 1, the compute node described herein permits the antenna applications $A_A$ and $A_B$ to be implemented in the services compartment. The application $A_A$ is thus only accessible by an authorized virtual machine of the virtual machine compartment associated with a certain entity. This virtual machine cannot see another other antenna applications implemented for other entities, such as the application $A_B$.

In the case of the automotive computing system of FIG. 2, the compute node described herein for example permits certain functions, such as a DRM (digital rights management) audio/video player, web browser and/or an environment control application to be run. These functions are for example provided by one or more virtual machines, which could be called "infotainment" virtual machines, in the VM compartment, while permitting a video CODEC accelerator for the DRM video player to be provided in the services compartment without any possible interaction with the video aids, breaking system or cruise control also for example implemented in the services compartment, and that, for example, use the same accelerator.

Having thus described at least one illustrative embodiment, various alterations, modifications and improvements will readily occur to those skilled in the art.

For example, it will be apparent to those skilled in the art that the various features described in relation to the various embodiments could be combined, in alternative embodiments, in any combination.

The invention claimed is:

1. A compute node comprising:
    one or more processors (306, 306A, 306B);
    one or more memory devices (308) storing software enabling virtual computing resources and virtual memory to be assigned to support:
        a virtual machines compartment (402) in which a plurality of virtual machines (VM) is enabled by a hypervisor (312); and
        a services compartment (404) comprising an operating system (OS) enabling one or more of: real time capabilities, security functionality, and hardware accelerators, wherein the services compartment further comprises a virtual machines service manager (412) adapted to manage service requests received from the virtual machines;
    a hardware partition (418) providing access control between the virtual machines (408) and the virtual machines services compartment (404), the hardware partition comprising:
    a first memory zone (308C) within the one or more memory devices accessible from only the services compartment;
    a second memory zone (308B) within the one or more memory devices accessible from both the services compartment and the virtual machines compartment; and
    a bus (422) accessible by the one or more processors (306, 306A, 306B) and coupled to the one or more memory devices (308), the bus having one or more bus lanes providing one or more access control bits for controlling access to the first and second memory zones, wherein:
        the first memory zone (308C) is associated with a first identifier comprising the access control bits and is adapted to be accessible by the bus (422) only when the one or more access control bits define a first state; and
        the second memory zone (308B) is a shared memory associated with a second identifier comprising the access control bits and is adapted to be accessible by the bus (422) only when the one or more access control bits define a second state different to the first state, wherein the second identifier comprises an identifier of the shared memory allocated by the virtual machine service manager (412).

2. The compute node of claim 1, wherein the bus (422) is further coupled to one or more peripheral devices, the one or more access control bits further controlling access to said peripheral devices.

3. The compute node of claim 1, wherein the one or more processors (306, 306A, 306B) are adapted to apply an identifier having the first state of the access control bits on the one or more bus lanes when accessing the first memory zone (308C) during execution of a service operation associated with the services compartment (404); and to assert an identifier having the second state of the access control bits on the one or more bus lanes when accessing the second memory zone (308B) in order to share data between the virtual machines compartment (402) and the services compartment (404).

4. The compute node of claim 1, wherein a first of the virtual machines is adapted to access the services compartment (404) by executing a service request instruction configured to be trapped by the hypervisor of the virtual machines compartment (402) and communicated to the virtual machines service manager (412).

5. The compute node of claim 1, wherein the services compartment (402) comprises a hardware accelerator (416), the hardware accelerator comprising one or more of:
   an FPGA (field programmable gate array);
   a GPU (Graphics Processing Unit);
   a DSP (Digital Signal Processor); and
   an ASIC (application specific integrated circuit).

6. The compute node of claim 1, wherein the services compartment (402) comprises a virtual trusted platform module.

7. A telecommunications system comprising the compute node of claim 1, wherein the services compartment (404) is adapted to execute first and second communications applications using a hardware accelerator and/or a real time function, the hardware partition permitting a first virtual machine of the virtual machine compartment (402) to access the first communications application and not the second communications application.

8. An automotive computing system comprising the compute node of claim 1, wherein the services compartment (404) is adapted to execute at least one function, using a hardware accelerator and/or a real time function, for controlling one or more of:
   a braking system;
   a video assistance system;
   an anti-theft security system; and
   a speed regulation system.

9. A method of accessing, by a first virtual machine of a plurality of virtual machines, services comprising one or more of real time capabilities, security functionality and hardware acceleration; the method comprising:
   providing a compute node comprising: one or more processors (306, 306A, 306B); and one or more memory devices (308) storing software enabling virtual computing resources and virtual memory to be assigned to support a virtual machines compartment (402) in which the plurality of the virtual machines (VM) is enabled by a hypervisor (312); and a services compartment (404) comprising an operating system (OS) enabling the services, wherein the services compartment further comprises a virtual machines service manager (412) for managing service requests received from the virtual machines; and
   providing access control between the virtual machines (408) and the virtual machines services compartment (404) using a hardware partition, wherein the hardware partition comprises a first memory zone (308C) within the one or more memory devices accessible from only the services compartment; a second memory zone (308B) within the one or more memory devices accessible from both the services compartment and the virtual machines compartment; and a bus (422) accessible by the one or more processors (306, 306A, 306B) and coupled to the one or more memory devices (308), wherein providing access control comprises providing, on one or more bus lanes of the bus, one or more access control bits for controlling access to the first and second memory zones, wherein:
      the first memory zone (308C) is associated with a first identifier comprising the access control bits and is adapted to be accessible by the bus (422) only when the one or more access control bits define a first state; and
      the second memory zone (308B) is a shared memory associated with a second identifier comprising the access control bits and is adapted to be accessible by the bus (422) only when the one or more access control bits define a second state different to the first state, wherein the second identifier comprises an identifier of the shared memory allocated by the virtual machine service manager (412).

10. The method of claim 9, further comprising:
    instantiating a new service by the first virtual machine; and
    accessing the new service by the first virtual machine.

11. A method of accessing, by a first virtual machine of a plurality of virtual machines, services comprising one or more of real time capabilities, security functionality and hardware acceleration;
    the method comprising:
    providing a compute node comprising: one or more processors (306, 306A, 306B); and one or more memory devices (308) storing software enabling virtual computing resources and virtual memory to be assigned to support a virtual machines compartment (402) in which the plurality of the virtual machines (VM) is enabled by a hypervisor (312); and a services compartment (404) comprising an operating system (OS) enabling the services, wherein the services compartment further comprises a virtual machines service manager (412) for managing service requests received from the virtual machines;
    providing access control between the virtual machines (408) and the virtual machines services compartment (404) using a hardware partition, wherein the hardware partition comprises a first memory zone (308C) within the one or more memory devices accessible from only the services compartment a second memory zone (308B) within the one or more memory devices accessible from both the services compartment and the virtual machines compartment and a bus (422) accessible by the one or more processors (306, 306A, 306B) and coupled to the one or more memory devices (308), wherein providing access control comprises providing, on one or more bus lanes of the bus, one or more access control bits for controlling access to the first and second memory zones;
    executing, by the first virtual machine, a service request instruction;
    trapping the service request instruction by the hypervisor of the virtual machines compartment (402); and
    communicating the service request instruction to the virtual machines service manager (412).

12. The method of claim 11, further comprising executing the service request instruction by the virtual machines services compartment (404) and providing a result to the first virtual machine via a memory zone (308B) shared by the first virtual machine and the virtual machine services compartment (404).

13. The method of claim 11, wherein the service request instruction is a secure monitor call (SMC) instruction.

14. A non-transitory computer-readable storage medium storing software instructions executable by one or more processors for implementing a method to cause a first virtual machine of a plurality of virtual machines, to access services comprising one or more of real time capabilities, security functionality and hardware acceleration; the method comprising:

providing a compute node comprising: one or more processors (306, 306A, 306B); and one or more memory devices (308) storing software enabling virtual computing resources and virtual memory to be assigned to support a virtual machines compartment (402) in which the plurality of the virtual machines (VM) is enabled by a hypervisor (312); and a services compartment (404) comprising an operating system (OS) enabling the services, wherein the services compartment further comprises a virtual machines service manager (412) for managing service requests received from the virtual machines; and providing access control between the virtual machines (408) and the virtual machines services compartment (404) using a hardware partition, wherein the hardware partition comprises a first memory zone (308C) within the one or more memory devices accessible from only the services compartment a second memory zone (308B) within the one or more memory devices accessible from both the services compartment and the virtual machines compartment and a bus (422) accessible by the one or more processors (306, 306A, 306B) and coupled to the one or more memory devices (308), wherein providing access control comprises providing, on one or more bus lanes of the bus, one or more access control bits for controlling access to the first and second memory zones, wherein:

the first memory zone (308C) is associated with a first identifier comprising the access control bits and is adapted to be accessible by the bus (422) only when the one or more access control bits define a first state; and the second memory zone (308B) is a shared memory associated with a second identifier comprising the access control bits and is adapted to be accessible by the bus (422) only when the one or more access control bits define a second state different to the first state, wherein the second identifier comprises an identifier of the shared memory allocated by the virtual machine service manager (412).

\* \* \* \* \*

UNITED STATES PATENT AND TRADEMARK OFFICE
CERTIFICATE OF CORRECTION

PATENT NO. : 9,898,327 B2
APPLICATION NO. : 15/073874
DATED : February 20, 2018
INVENTOR(S) : Michele Paolino Page 1 of 1

It is certified that error appears in the above-identified patent and that said Letters Patent is hereby corrected as shown below:

In the Specification

In Column 1, Line 10, please delete the following paragraph:
"The work leading to this invention has received funding from the European Union Seventh Framework Programme FP7/2007-2013 and Horizon 2020 Programme H2020/2014-2020 under grant agreements no 318036, and no 645119."

And insert the following amendment paragraph:
--The work leading to this invention has received funding from the European Union Seventh Framework Programme FP7/2007-2013 and Horizon 2020 Programme H2020/2014-2020 under grant agreements no 318036, no 645119 and no 761557.--

Signed and Sealed this
Twenty-seventh Day of March, 2018

Andrei Iancu
*Director of the United States Patent and Trademark Office*